United States Patent Office 3,394,129
Patented July 23, 1968

3,394,129
STEROIDAL γ-LACTONES AND THE
PREPARATION THEREOF
Donald E. Ayer, Kalamazoo, Mich., assignor to The Upjohn Company, Kalamazoo, Mich., a corporation of Delaware
No Drawing. Filed July 1, 1965, Ser. No. 468,951
9 Claims. (Cl. 260—239.57)

This invention relates to novel steroidal γ-lactones in which the group attached at the 17-position has the structure

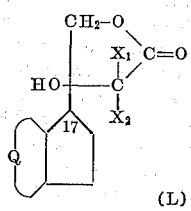

(L)

wherein $X_1$ and $X_2$ are selected from the group consisting of chlorine and fluorine, Q being the remainder of the steroid moiety, and methods used in the preparation thereof.

More particularly, this invention relates to steroidal γ-lactones represented by the following formulae:

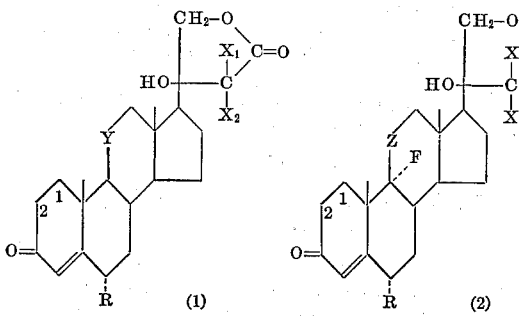

where R is selected from the group consisting of hydrogen, methyl and fluoro, $X_1$ and $X_2$ have the meanings previously given, Y is selected from the group consisting of methylene (>CH₂), β-hydroxymethylene

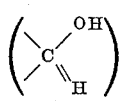

and carbonyl, Z is selected from the group consisting of β-hydroxymethylene

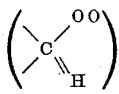

and carbonyl (>C=O), and the 1,2-carbon atom linkage is selected from the group consisting of single and double bond linkages.

The novel compound of Formula L and more particularly the compounds of Formulas 1 and 2 possess useful therapeutic properties. Each possesses cardiotonic, anti-inflamatory, salt and water regulating, pituitary inhibiting, anti-anabolic, muscle relaxant, anti-fertility, cytotoxic, anti-viral, and antimicrobial activies.

The compounds of the formulas depicted above are useful in the treatment of diseases of animals and are particularly useful in the treatment of inflammatory conditions of mammals and birds, such as the treatment of inflammatory conditions of the skin, eyes and ears of valuable domestic animals, as well as contact dermatitis and other allergic reactions.

Additionally, the compounds of the formula depicted above are useful in treating mental disease states and circulatory diseases in mammals and birds, and more particularly in valuable domestic animals. These compounds have digitalis-like activity in increasing the contractility of the heart muscle, diminishing the heart rate and improving cardiac efficiency. In addition, they possess the advantage of a greater margin of safety relative to digitalis and related drugs.

Administration of the compounds of Formulas L, 1 and 2 can be in conventional dosage forms, such as pills, tablets, capsules, syrups or elixirs for oral use, or in liquid forms which are suitable for injectable products. They can also be administered topically in the form of ointments, creams, lotions and the like.

The compounds of Formulas L, 1 and 2 in non-toxic solutions, are also useful for the irrigation of surgical wounds, particularly following the removal of tumorous tissues, to prevent wound seeding.

The novel compounds of Formula L are prepared according to the following reaction scheme:

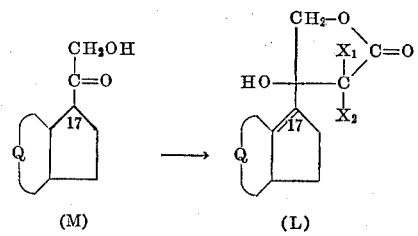

(M)          (L)

wherein Q, $X_1$ and $X_2$ have the same meanings as previously given.

The compounds of Formula L are obtained by treating a compound of Formula M, a 21-hydroxy-20-oxo-steroid, with a γ-lactonizing agent having the formula:

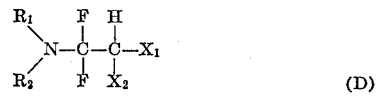
(D)

wherein $X_1$ and $X_2$ are selected from the class consisting of chlorine and fluorine, $R_1$ and $R_2$ taken individually represent lower-alkyl, and $R_1$ and $R_2$ taken together with the attached nitrogen atom represent the residue of a heterocyclic radical containing from 5 to 7 ring atoms, inclusive, in an inert organic solvent, whereby the steroidal γ-lactone is formed.

The term "lower-alkyl" means an alkyl radical containing from 1 to 8 carbon atoms, inclusive, such as methyl, ethyl, propyl, butyl, amyl, hexyl, heptyl, octyl, and isomeric forms thereof. The term "heterocyclic radical containing from 5 to 7 ring atoms, inclusive" is inclusive of pyrrolidino, 2 - methylpyrrolidino, 2,2 - dimethylpyrrolidino, and the like alkylpyrrolidino groups, 4-methylpiperazino, 2,4-dimethylpiperazino, and like alkylpiperazino groups, morpholino, piperidino, 2-methylpiperidino, 3 - methylpiperidino, and like alkyl-piperidino groups, hexamethyleneimino, hommorpholino, and the like.

Examples of γ-lactonizing agents having the Formula D are N - (2 - chloro - 1,1,2 - trifluoroethyl)diethylamine, N - (1,1,2,2 - tetrafluoroethyl)diethylamine, N-(2 - chloro - 1,1,2 - trifluoroethyl)dimethylamine, N-(2 - chloro - 1,1,2 - trifluoroethyl)dipropylamine, N-(2 - chloro - 1,1,2 - trifluoroethyl)diisobutylamine, N-(2 - chloro - 1,1,2 - -trifluoroethyl)methylethylamine, N - (2,2 - dichloro - 1,1 - difluoroethyl)diethylamine, N - (2,2 - dichloro - 1,1 - difluoroethyl)dimethylamine, N - (1,1,2,2 - tetrafluoroethyl)pyrrolidine, N - (1,1,2,2-tetrafluoroethyl)diisoproylamine, N - (1,1,2,2 - tetra-fluoroethyl) piperidine, and the like.

The term "inert organic solvent" means any organic solvent which does not react with the γ-lactonizing agent and in which the steroid starting material is appreciably soluble such as aromatic and aliphatic hydrocarbons, halogenated hydrocarbons, esters, ketones, ethers and tertiary alcohols. Examples of such solvents are benzene, toluene, chlorobenzene, pentane, hexane, cyclohexane, ethyl acetate, butyl acetate, acetone, methyl ethyl ketone, tetrahydrofuran, ethyl ether, t-butyl alcohol, t-amyl alcohol, and the like. Advantageously, the inert organic solvent employed in the process of the invention is a halogenated aliphatic hydrocarbon such as methylene chloride, chloroform, carbon tetrachloride, ethylene dichloride, ethylidene chloride, propylene chloride, trimethylene chloride, and the like. The solvent which is particularly preferred is methylene chloride.

Advantageously, the reaction in which the compounds of Formula M are converted to the compounds of Formula L is carried out at a temperature of from about −20° C. to 100° C. with a temperature of 0° C. to 40° C. being preferred. The reaction time can be varied from 1 hour to 48 hours depending on the reaction temperature. Generally, it is preferred to carry out the reaction at a temperature of 25° for 18 hours.

The compounds of Formula L are recovered following the reaction by removal of the solvent, fractional crystallization, chromatography of the total crude reaction product on acid-washed alumina, Florisil (synthetic magnesium silicate), silica-gel, or silicic acid, eluting with chloroform containing increasing amounts of methanol or hexanes containing increasing amounts of acetone, or methylene chloride containing increasing amounts of acetone, Craig countercurrent partition separation, column partition chromatography, preparative paper chromatography, or a combination of these.

The following examples illustrate the best mode contemplated by the inventor for carrying out his invention but are not to be construed as limiting the scope thereof.

EXAMPLE 1

*22-chloro-22-fluoro-20,21-dihydroxy-3-oxo-23-norchol-4-enic acid γ-lactone*

To a solution of 4.95 g. of 21-hydroxy-4-pregnene-3,20-dione in 75 ml. of methylene chloride there was added 5 ml. of N-(2-chloro-1,1,2-trifluoroethyl)diethylamine and the reaction mixture was allowed to stand for 18 hours at about 25° C. Ice water was added and the organic layer was separated, washed with sodium bicarbonate solution, dried and evaporated to dryness on a steam bath. The residue remaining upon removal of the solvent was taken up in methylene chloride and poured onto a chromatographic column of synthetic magnesium silicate (Florisil) packed wet in commercial hexanes. The chromatographic column was then eluted with a mixture of commercial hexanes containing increasing proportions of acetone. The eluate fractions were freed of solvent and those fractions eluted with commercial hexanes containing 15 to 20% acetone were combined to give 2.5 g. of a product containing 22-chloro-22-fluoro-20,21-dihydroxy-3-oxo-23-norchol-4-enic acid γ-lactone and having a melting point of 248–256° C. Several recrystallizations from acetone-commercial hexanes gave an analytical sample of 22-chloro-22-fluoro-20,21-dihydroxy-3-oxo-23-norchol-4-enic acid γ-lactone having a melting point of 258–260° C.

$\lambda_{max.}^{EtOH}$ 241 mµ (ε=17,000)

infrared absorption bands (Nujol) at 3600, 3320, 1815, 1660, 1610 cm.$^{-1}$, and the following analysis:

*Analysis.*—Calculated for $C_{23}H_{30}ClFO_4$: C, 65.00; H, 7.12; Cl, 8.34; F, 4.47. Found: C, 65.46; H, 7.13; Cl, 8.47; F, 3.92.

In like manner substituting other γ-lactonizing agents for N-(2-chloro-1,1,2-trifluoroethyl)diethylamine there is obtained the corresponding 22,22-difluoro- and 22,22-dichloro-20,21-dihydroxy-3-oxo-23-norchol-4-enic acid γ-lactone.

Similarly substituting other 21-hydroxy-20-oxosteroids of the pregnane series for 21-hydroxy-4-pregnene-3,20-dione is productive of their corresponding 22-chloro-22-fluoro-, 22,22-difluoro- and 22,22-dichloro-20,21-dihydroxy-23-norcholanic acid γ-lactones.

EXAMPLE 2

*22-chloro-22-fluoro-11β,20,21-trihydroxy-3-oxo-23-norchol-4-enic acid γ-lactone*

To a solution of 8.2 g. of 11β,21-dihydroxy-4-pregnane-3,20-dione in 150 ml. of tetrahydrofuran there was added 10 ml. of N-(2-chloro-1,1,2-trifluoroethyl)diethylamine. The reaction was allowed to stand at 25° C. for 24 hours. The reaction mixture was cooled, 11 g. of solid sodium bicarbonate was added thereto followed by the addition of 150 ml. of ice water. This mixture was then concentrated at reduced pressure and extracted with methylene chloride and the methylene chloride extracts were chromatographed on 500 g. of Florisil (synthetic magnesium silicate) packed wet in methylene chloride. The chromatographic column was then eluted with a mixture of methylene chloride containing increasing proportions of acetone. Those fractions eluted withe methylene chloride containing 8 to 10% acetone were crystallized from acetone-commercial hexanes to give 0.69 g. of a residue containing 22-chloro-22-fluoro-11β,20,21-trihydroxy-3-oxo-23-norchol-4-enic acid γ-lactone having a melting point of 258–264° C. Further crystallization of this residue from acetone-commercial hexanes gave an analytical sample of 22-chloro-22-fluoro-11β,20,21-trihydroxy-3-oxo-23-norchol-4-enic acid γ-lactone having a melting point of 265–267° C. (dec.) infrared absorption bands (Nujol) at 3550, 3370, 1798, 1650, 1604 cm.$^{-1}$ and the following analysis:

*Analysis.*—Calculated for $C_{23}H_{30}ClFO_5$: Cl, 8.04; F, 4.31. Found: Cl, 7.91; F, 3.73.

EXAMPLE 3

*22,22-difluoro-20,21-dihydroxy-3-oxo-23-norchol-4-enic acid γ-lactone*

Substituting a stoichiometric equivalent amount of N-(1,1,2,2-tetrafluoroethyl)diethylamine for the N-(2-chloro-1,1,2-trifluoroethyl)diethylamine of Example 1, and following the procedure of Example 1, is productive of 22,22-difluoro-20,21-dihydroxy-3-oxo-23-norchol-4-enic acid γ-lactone.

EXAMPLE 4

*22,22-dichloro-11β,20,21-trihydroxy-3-oxo-23-norchol-4-enic acid γ-lactone*

Substituting a stoichiometric equavalent amount of N-(2,2-dichloro-1,1-difluoroethyl)diethylamine for the N-(2-chloro-1,1,2-trifluoroethyl)diethylamine of Example 2, and following the procedure of Example 2, is productive of 22,22-dichloro-11β,20,21-trihydroxy-3-oxo-23-norchol-4-enic acid γ-lactone.

I claim:
1. Compounds of the formula:

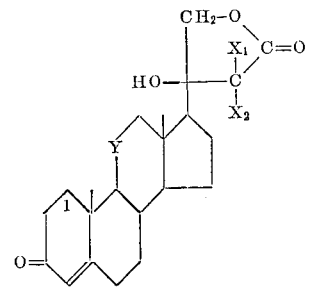

wherein $X_1$ and $X_2$ are selected from the group consisting of chlorine and fluorine, Y is selected from the group consisting of methylene (>CH$_2$), and β-hydroxymethylene

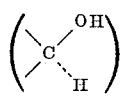

and the 1,2-carbon atom linkage is selected from the group consisting of single and double bond linkages.

2. 22 - chloro - 22 - fluoro - 20,21 - dihydroxy - 3 - oxo-23-norchol-4-enic acid γ-lactone.

3. 22 - chloro - 22 - fluoro - 11β,20,21 - trihydroxy - 3-oxo-23-norchol-4-enic acid γ-lactone.

4. 22,22 - dichloro - 20,21 - dihydroxy - 3 - oxo - 23-norchol-4-enic acid γ-lactone.

5. 22,22 - difluoro - 20,21 - dihydroxy - 3 - oxo - 23-norchol-4-enic acid γ-lactone.

6. 22,22 - dichloro - 11β,20,21 - trihydroxy - 3 - oxo-23-norchol-4-enic acid γ-lactone.

7. Process for the production of steroidal γ-lactones in which the group attached at the 17-position has the structure

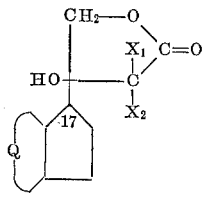

wherein X$_1$ and X$_2$ are selected from the group consisting of fluorine and chlorine and Q is the remainder of the steroid moiety which comprises reacting a 21-hydroxy-20-oxo steroid of the formula

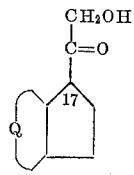

wherein Q has the meaning previously given with a γ-lactonizing agent of the formula

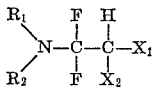

wherein X$_1$ and X$_2$ have the meaning previously given, R$_1$ and R$_2$ taken individually represent lower alkyl radicals containing from 1 to 8 carbon atoms, inclusive, and R$_1$ and R$_2$ taken together with the attached nitrogen atom represent the residue of a heterocyclic radical containing from 5 to 7 ring atoms, inclusive.

8. Process for the production of compounds of the formulae

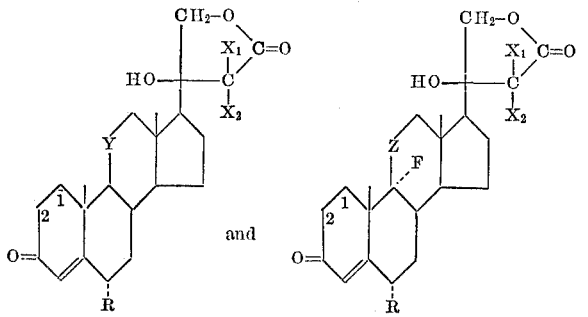

wherein R is selected from the group consisting of hydrogen, methyl and fluoro, X$_1$ and X$_2$ are selected from the group consisting of chlorine and fluorine, Y is methylene (>CH$_2$), β-hydroxymethylene

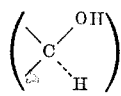

and carbonyl (>C=O), Z is selected from the group consisting of β-hydroxymethylene

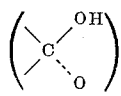

and carbonyl (>C=O), and the 1,2-carbon atom linkage is selected from the group consisting of single and double bond linkages which comprises reacting the compounds of the formulae

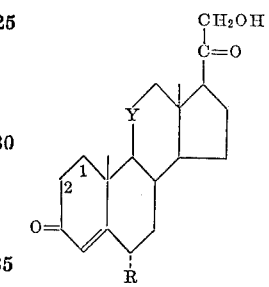 and 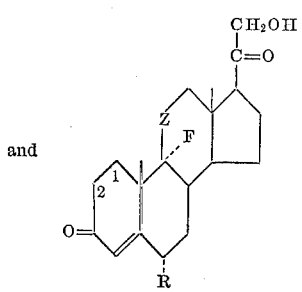

wherein R, X$_1$ and X$_2$, Y, Z and the 1,2-carbon atom linkage have the meanings previously given with a γ-lactonizing agent of the formula

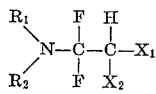

wherein X$_1$ and X$_2$ have the meaning previously given, R$_1$ and R$_2$ taken individually represent lower alkyl radicals containing from 1 to 8 carbon atoms, inclusive, and R$_1$ and R$_2$ taken together with the attached nitrogen atom represent the residue of a heterocyclic radical containing from 5 to 7 ring atoms, inclusive.

9. The process of claim 8 in which the starting material is 11β,21-dihydroxy-4-pregnene-3,20-dione and the γ-lactonizing agent is N-(2-chloro-1,1,2-trifluoroethyl)diethylamine.

References Cited
UNITED STATES PATENTS 2,361,964  11/1944  Ruzicka et al. _____ 260—239.5
2,390,526  12/1945  Elderfield _____ 260—239.5

LEWIS GOTTS, *Primary Examiner.*

E. G. LOVE, *Assistant Examiner.*

UNITED STATES PATENT OFFICE
CERTIFICATE OF CORRECTION

Patent No. 3,394,129                          July 23, 1968

Donald E. Ayer

It is certified that error appears in the above identified patent and that said Letters Patent are hereby corrected as shown below:

Column 1, lines 45 to 47, lines 52 to 54, and column 6, lines 12 to 17, the formula, each occurrence, should appear as shown below:

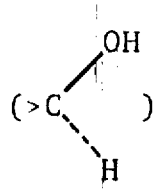

Column 2, second formula (L) should appear as shown below:

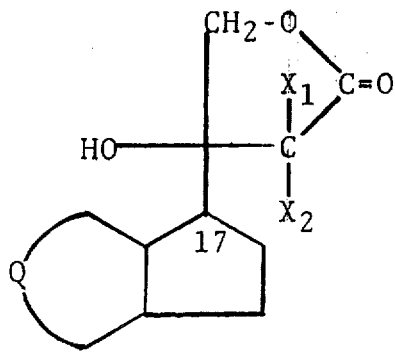

same column 2, line 57, "hommorpholino" should read -- homomorpholino --.  Column 4, line 36, "Cl, 7:91" should read -- Cl, 7.91 --.

Signed and sealed this 24th day of February 1970.

(SEAL)
Attest:

EDWARD M. FLETCHER, JR.                  WILLIAM E. SCHUYLER, JR.
Attesting Officer                          Commissioner of Patents